(12) United States Patent
Larsen

(10) Patent No.: US 6,371,342 B2
(45) Date of Patent: *Apr. 16, 2002

(54) CARGO RETENTION SYSTEM

(75) Inventor: Lance E. Larsen, Southfield, MI (US)

(73) Assignee: Johnson Controls Technology Company, Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,693

(22) Filed: Apr. 27, 1999

Related U.S. Application Data

(60) Provisional application No. 60/093,598, filed on Jul. 21, 1998.

(51) Int. Cl.[7] .............................. B60R 7/04; B60R 7/08
(52) U.S. Cl. ...................................... 224/311; 225/568
(58) Field of Search .............................. 224/311, 567, 224/568, 917

(56) References Cited

U.S. PATENT DOCUMENTS

| | | | | |
|---|---|---|---|---|
| 1,837,537 A | * | 12/1931 | Emerson | 224/311 |
| 1,978,216 A | * | 10/1934 | Miller | 224/311 X |
| 2,660,349 A | * | 11/1953 | Bernau | 224/311 X |
| 2,988,252 A | * | 6/1961 | Crane | 224/311 |
| 3,524,572 A | * | 8/1970 | Hall | 224/311 |
| 3,746,224 A | * | 7/1973 | Folgner | 224/311 |
| 4,982,883 A | * | 1/1991 | Ullal et al. | 224/917 X |
| 5,094,351 A | * | 3/1992 | Barney | 224/311 X |

FOREIGN PATENT DOCUMENTS

| | | | | |
|---|---|---|---|---|
| DE | 819199 | * | 10/1951 | 224/311 |
| DE | 207271 | * | 7/1965 | 224/311 |
| FR | 42551 | * | 8/1933 | 224/311 |
| FR | 1410142 | * | 7/1965 | 224/311 |

OTHER PUBLICATIONS 819,199 to Zeichnungen; appears to be a German reference; best current available copy.*

* cited by examiner

Primary Examiner—Gregory M. Vidovich
(74) Attorney, Agent, or Firm—Foley & Lardner

(57) ABSTRACT

A removably attached overhead bar module having retention devices attached thereto. Retention devices allow for items to be carried within the interior compartment while still allowing occupants to be seated in the traditional seating positions. Further provided is an overhead net module extending between the bars of the overhead bar module.

9 Claims, 3 Drawing Sheets

CARGO RETENTION SYSTEM

This Application claims benefit to Prov. No. 60/093,548 filed Jul. 21, 1998.

TECHNICAL FIELD OF THE INVENTION

This invention generally relates to a cargo retention system for an interior compartment of a vehicle and, more particularly, to an overhead bar module that is removably attached to a surface of the interior compartment and that provides retention devices to retain cargo.

BACKGROUND AND SUMMARY OF THE INVENTION

Providing convenient storage for items that may have a considerable length in comparison to the interior compartment of a vehicle has been a long-standing challenge for automotive suppliers and manufacturers. While some flexible seating arrangements in current vehicles can be removed or folded to store long items in the occupant compartment, these seating arrangements reduce or eliminate the ability to carry occupants concurrently with the long items. The present invention is intended to provide a system allowing for long items and occupants to both be carried in the interior compartment of a vehicle.

In accordance with the teachings of the present invention, there is provided a removably attached overhead bar module having retention devices attached thereto. The retention devices allow for items to be carried within the interior compartment while still allowing occupants to be seated in the traditional seating positions. Further provided is an overhead net module extending between the bars of the overhead bar module.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

The following description of the preferred embodiment is merely exemplary in nature and is in no way intended to limit the invention, or its application, or uses.

Figure 1:
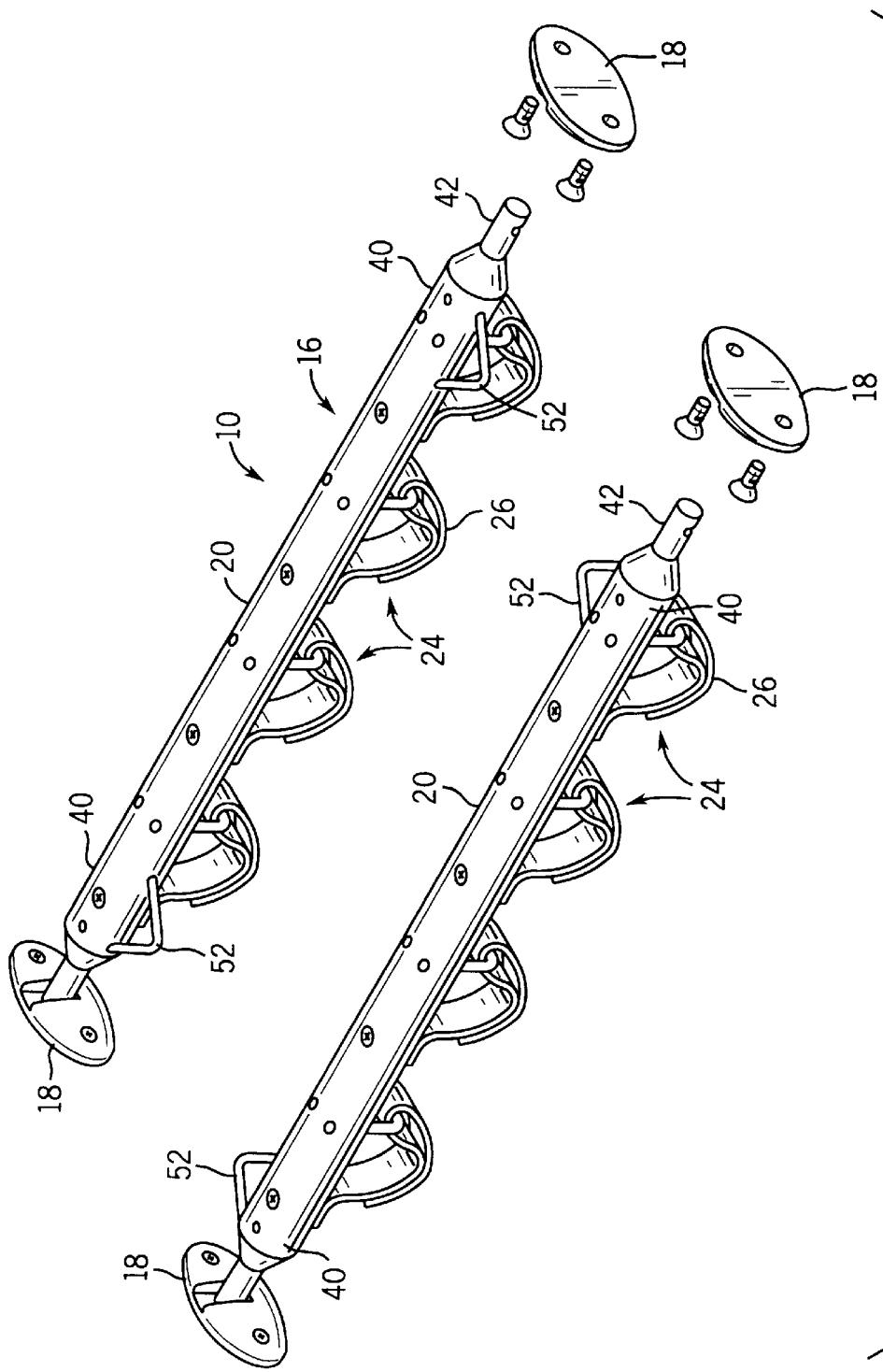
FIG. 1 is a perspective view of a cargo retention system made in accordance with the teachings of the present invention.

With reference to the figures, there is shown a cargo retention system 10 that is mounted within the interior compartment of a vehicle. System 10 generally includes one or more overhead bar modules 16, and mounting elements 18 which are secured to an interior surface of the roof structure or an upper body side portion of the vehicle and coordinate with the opposing ends of bar module 16, as shown in FIG. 1.

While not specifically shown, it is within the scope of the present invention to provide mounting elements 18 as integrated formations in an interior trim component of a vehicle. Specifically, the formation of mounting element 18 can be integrally formed in a coat hook; grab handle; interior light bezel or housing; B, C, or D pillar trim panels; body side quarter trim panels; or any other component within the interior of the vehicle that will provide sufficient structural support for the overhead bar modules 16 and the cargo reasonably expected to be secured thereto.

Bar module 16 generally includes an elongated bar 20, which in the preferred embodiment is an extruded aluminum tube. Bar 20 may be made by a variety of methods and of a variety of materials including, but not limited to, metal, plastic, resin, wood, or a composite including any or all of the above. Bar 20 may also be made from separate elongated members that are telescopically connected to each other, or that are separately connected to a common third bar, allowing bar 20 to span differing widths. Secured to bar are retention devices 24.

Figure 2:
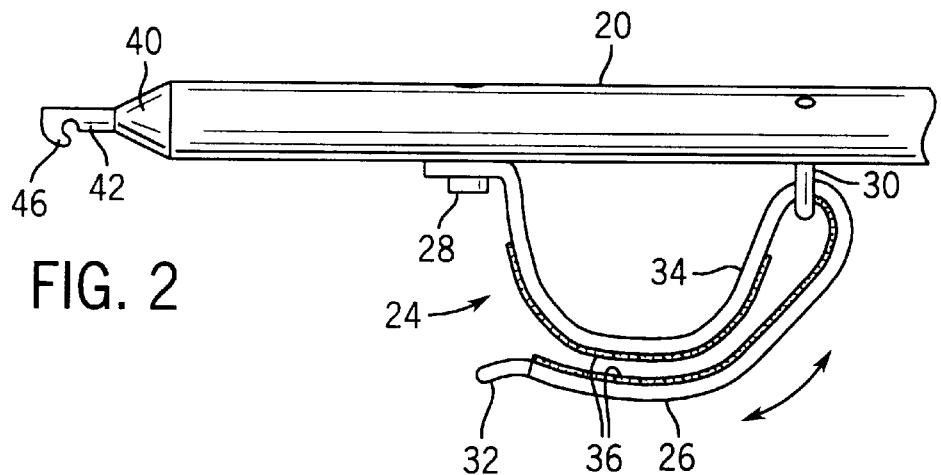
FIG. 2 is a partial front view of one of the bars of the overhead bar module.

Retention devices 24, in the preferred embodiment, are strap members 26 having a first end secured to bar 20 by a retainer 28 and a second end which freely passes through a loop 30 distally displaced along bar 20, as shown in FIG. 2. Free end 32 of strap member 26 is laid back upon a middle section 34 of strap member 26 and provides an interlocking fastening means 36 therebetween. Interlocking fastening means 36 may be any of a wide variety of fastening means known in the industry including, but not limited to, VELCRO®, snaps, DUAL-LOCK®, and the like. Further, it is within the scope of the present invention to incorporate a dual ring synching system (similar to that used with automobile and motor cycle helmets) at or near loop 30.

Figure 3:
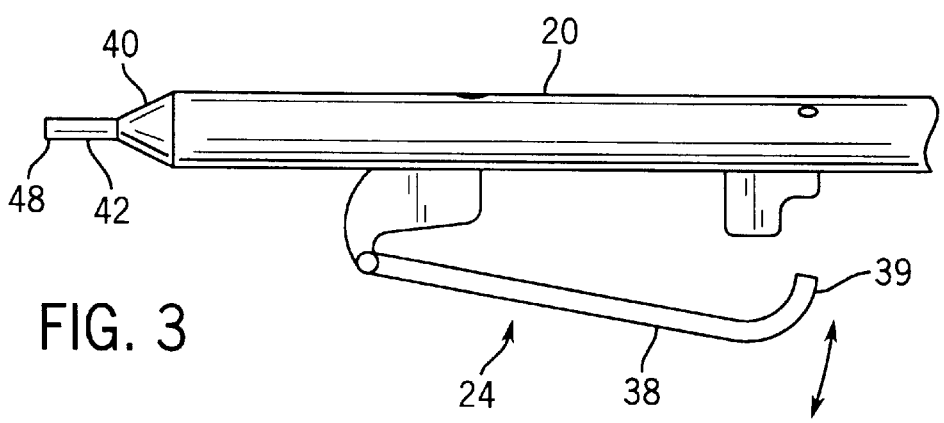
FIG. 3 is a partial front view of an alternative embodiment of the bar shown in FIG. 2.

In an alternative embodiment of the present invention, retention devices 24 are clamping arms 38, as shown in FIG. 3. Clamping arms 38 include a first end pivotally secured to bar 20, and a second end 39 selectively attachable to bar 20. In use, the second end is detached from bar 20 and is pivoted to an open position. The item of cargo is placed between arm 38 and bar 20. Arm 38 is then pivoted to a closed position and second end 39 is attached to bar 20 to secure the cargo. In farther alternative embodiments of the present invention, retention devices 24 are hook members or eyelet members (both not shown) or any other useful device suitable for retaining cargo such as sport equipment, car accessories, or grocery bags.

Figure 4:
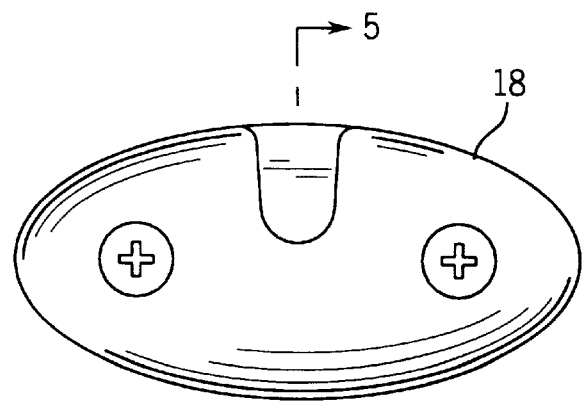
FIG. 4 is a side view of a mounting element made in accordance with the teachings of the present invention.
Figure 5:
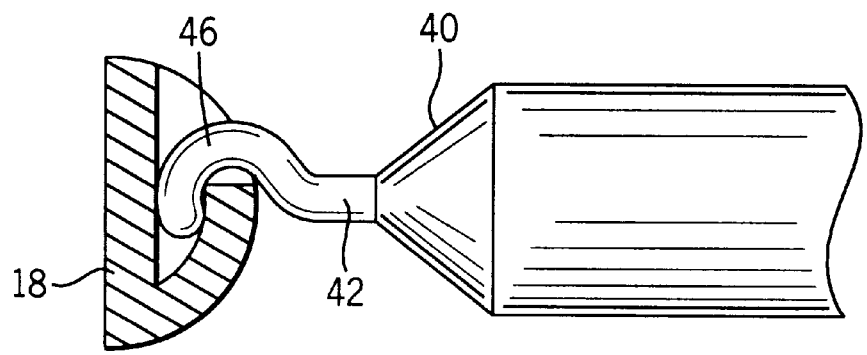
FIG. 5 is cross-sectional view of the mounting element taken along the line 5—5 of FIG. 4 with a partial view of one of the bars of the overhead bar module.

Near each opposing end 40 of bar 20 there is located a connector element 42 adapted to engage mounting element 18, as shown best in FIG. 2. Connector element 42 need not be symmetrical at each opposing end of bar 20 as will become apparent below. Connector element 42 provides a hook portion 46 that is axially biased inward toward bar 20 by a spring. The inward bias of the hook portion 46 aids In retaining bar 20 in mounting element 18, as shown In FIGS. 4 and 5. While a spring bias element can be Incoorpated in each opposing end of bar 20, it is within the scope of the present invention to provide a spring bias element only on one of the two opposing ends of bar 20 and provide a fixed hook portion (not showh) a the other end, or to provide a fixed portion on both opposing ends of bar 20. Mounting element 18 provides attachment locations for securing mounting element 18 to an interior surface of the roof or body side structure of the vehicle. Further included is a retention aperture 19 coordinated with hook portions 46.

In an alternative embodiment as shown in FIG. 3, connector element 42 provides a pin portion 48 that is axially biased outward from bar 20 by a spring. The outward bias of the pin portion 48 aids in retaining bar 20 against mounting element 18, Again, while a spring bias element can be incorporated in each opposing end of bar 20, it Is within the scope of the present invention to provide a spring bias element only on one of the two opposing ends of bar 20 and to provide a fixed pin portion (not shown) at the other end, or to provide a fixed pin portion on both opposing ends of bar 20.

Figure 6:
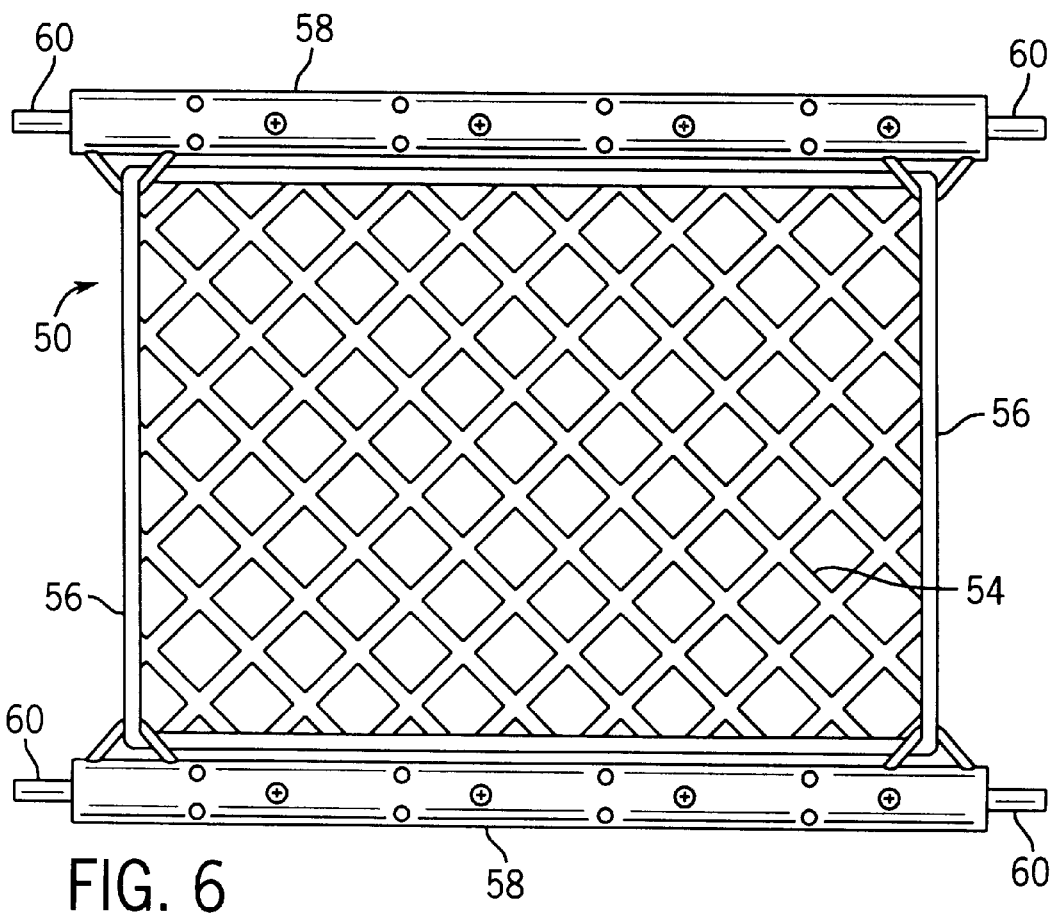
FIG. 6 is a bottom view of an overhead net module connectable between the bars of the present invention.

An overhead net module 50 can be incorporated with cargo retention system 10, as shown in FIG. 6. Net module 50 spans between and is removably connected to attachment locations 52 (shown in FIG. 1). Net module 50 of the preferred embodiment includes an elastic net portion 54, attached to elastic end chords 56 that are secured to side panel members 58. In alternative embodiments, net portion 54 may be made from a non-elastic material, or end chords 56 may be made from a non-elastic material, or both net portion 54 and end chords 56 may be made from a non-elastic material. At each opposing end of side panel members 58 there is provided a hook means 60 intended to engage attachment locations 52 thereby securing the net module 50 between bars 20. Net module 50 is intended to secure items that do not lend themselves to being retained by retention devices 24.

The foregoing discussion discloses and describes a preferred embodiment of the present invention. One skilled in the art will readily recognize from such discussion, and from the accompanying drawings, that various changes, modifications, and variations can be made therein without departing from the true spirit and fair scope of the invention.

I claim:

1. A cargo retention system for an occupant compartment of a vehicle comprising:
   a first pair of mounting elements securable to the occupant compartment;
   a first elongated bar having a first pair of connector elements, the first pair of connector elements located at opposing ends of the first elongated bar for removably attaching the first elongated bar to the first pair of mounting elements;
   a second pair of mounting elements secured to the interior surface of the occupant compartment;
   a second elongated bar having a second pair of connector elements, the second pair of connector elements located at opposing ends of the second elongated bar for removably attaching the second elongated bar to the second pair of mounting elements;
   a net member removably attachable to the first and second elongated bars for supporting cargo above the net member in the occupant compartment of the vehicle; and
   a retention device coupled to one of the first and second elongated bars for retaining cargo in the occupant compartment of the vehicle, the retention device including a strap member;
   wherein the retention device further includes a retainer secured to the one of the first and second elongated bar for securing a first end of the strap member, a loop secured to the one of the first and second elongate bar for supporting a middle section of the strap member, and an interlocking fastener operable to fasten a second end of the strap member to a portion of the strap member between the first end and the middle section.

2. The cargo retention system of claim 1, wherein at least one of the first pair of connector elements includes a hook adapted to engage at least one of the first pair of mounting elements.

3. The cargo retention system of claim 2, wherein the hook is axially biased inward toward the first elongate bar.

4. The cargo retention system of claim 3, wherein the hook is axially biased by a spring mechanism.

5. A cargo retention system for an occupant compartment of a vehicle comprising;
   a first pair of mounting elements securable to the occupant compartment;
   a second pair of mounting elements securable to the occupant compartment;
   a first elongated bar having a first pair of connector elements located at opposing ends of the first elongated bar and configured for removably attaching the first elongated bar to the first pair of mounting elements, at least one of the first pair of connector elements including a hook adapted to engage a retention aperture on at least one of the first pair of mounting elements; and
   a second elongated bar having a second pair of connector elements, the second pair of connector elements located at opposing ends of the second elongated bar for removably attaching the second elongated bar to the second pair of mounting elements;
   a first retention device coupled to one of the first and second elongated bars for retaining cargo in the occupant compartment of the vehicle;
   a second retention device coupled to the other of the first and second elongated bars for retaining cargo in the occupant compartment of the vehicle, the second retention device including a strap, a retainer securable to the other of said bars for securing a first end of the strap, a loop securable to the other of said bars for supporting a middle section of the strap, and an interlocking fastener operable to fasten a second end of the strap to a portion of the strap between the first end and the middle section.

6. The cargo retention system of claim 5, wherein the hook is axially biased inward toward the first elongate bar.

7. The cargo retention system of claim 6, wherein the hook is axially biased by a spring mechanism.

8. The cargo retention system of claim 5, wherein the second pair of mounting elements is secured to the interior surface of the occupant compartment.

9. The cargo retention system of claim 5, further including a net member removably attachable to the first and second elongated bars for supporting cargo above the net member in the occupant compartment of the vehicle.

* * * * *